United States Patent [19]

Dodd et al.

[11] 4,346,756
[45] Aug. 31, 1982

[54] APPARATUS FOR SELECTIVELY HEATING AN INDIVIDUAL FOOD ITEM IN A REFRIGERATED ENVIRONMENT

[75] Inventors: Malcolm J. Dodd; Joseph A. Juhas, both of Litchfield, Conn.

[73] Assignee: UOP Inc., Des Plaines, Ill.

[21] Appl. No.: 179,858

[22] Filed: Aug. 20, 1980

[51] Int. Cl.³ .............................................. F25B 29/00
[52] U.S. Cl. .................................... 165/48 R; 165/64; 165/DIG. 26; 219/386; 219/400; 312/236; 126/268
[58] Field of Search .................... 165/48 R, 58, 61, 64, 165/DIG. 25, DIG. 26; 312/236; 186/1 AC; 126/246, 268; 219/386, 387, 400, , 433, 436, 460, 521

[56] References Cited

U.S. PATENT DOCUMENTS

| | | | |
|---|---|---|---|
| 2,616,269 | 11/1952 | Reynolds | 62/89 |
| 2,919,339 | 12/1959 | Hilliker | 219/35 |
| 3,042,384 | 7/1962 | Bauman | 257/293 |
| 3,129,041 | 4/1965 | Traycoff et al. | 312/236 |
| 3,199,579 | 8/1965 | Foster et al. | 165/48 |
| 3,205,033 | 9/1965 | Stentz | 312/236 |
| 3,275,393 | 9/1966 | Stentz et al. | 312/214 |
| 3,389,946 | 6/1968 | Nicolaus et al. | 312/236 |
| 3,408,481 | 10/1968 | Golden | 219/386 |
| 3,608,627 | 9/1971 | Shevlin | 165/2 |
| 3,615,713 | 10/1971 | Stevenson | 99/171 H |
| 3,725,645 | 4/1973 | Shevlin | 219/521 |
| 3,784,787 | 1/1974 | Shevlin | 219/386 |
| 3,830,148 | 8/1974 | Shevlin | 99/359 |
| 3,908,749 | 9/1975 | Williams | 165/61 X |
| 3,924,100 | 12/1975 | Mack et al. | 219/386 |
| 3,973,103 | 8/1976 | Tadewald | 219/543 |
| 4,005,745 | 2/1977 | Colato et al. | 165/2 |
| 4,041,277 | 8/1977 | Shumrak et al. | 219/386 |
| 4,052,589 | 10/1977 | Wyatt | 219/400 |
| 4,180,125 | 12/1979 | Schulz et al. | 165/48 R |
| 4,225,204 | 9/1980 | Bellavoire | 312/236 |
| 4,254,824 | 3/1981 | Springer | 165/64 |
| 4,285,391 | 8/1981 | Bourner | 165/61 X |

*Primary Examiner*—Albert W. Davis
*Assistant Examiner*—Margaret A. Focarino
*Attorney, Agent, or Firm*—James R. Hoatson, Jr.; Barry L. Clark; William H. Page, II

[57] ABSTRACT

A cabinet type enclosure, for refrigerating a plurality of food items on a plurality of specially configured meal trays has a plurality of thin, generally horizontal, fixedly mounted heater shelf members extending into the enclosed space from one side wall thereof. One or more covered containers of food to be heated are positioned on one side of the trays and are mounted on the trays slightly above the top surface of the tray and with their bottom surfaces in contact with heater plates on the heater shelf members. The meal trays have integral transverse abutment means which cooperate with portions of a container for hot food placed on the tray adjacent the abutment means for preventing longitudinal movement of the hot food container past the transverse abutment means by frictional contact of the container with the heater shelf as the tray is moved into or out of the enclosure and relative to the heater shelf along tray guides. The heater shelf members are preferably sufficiently narrow that they will terminate short of the transverse abutment means. Guide means, which may comprise elongated side runners on the bottoms of the containers and spaced complementary retaining ribs on the tray surface, prevent the containers from rotating as they are moved along the heater shelves. The apparatus is particularly useful for inflight feeding as well as for institutional feeding.

13 Claims, 8 Drawing Figures

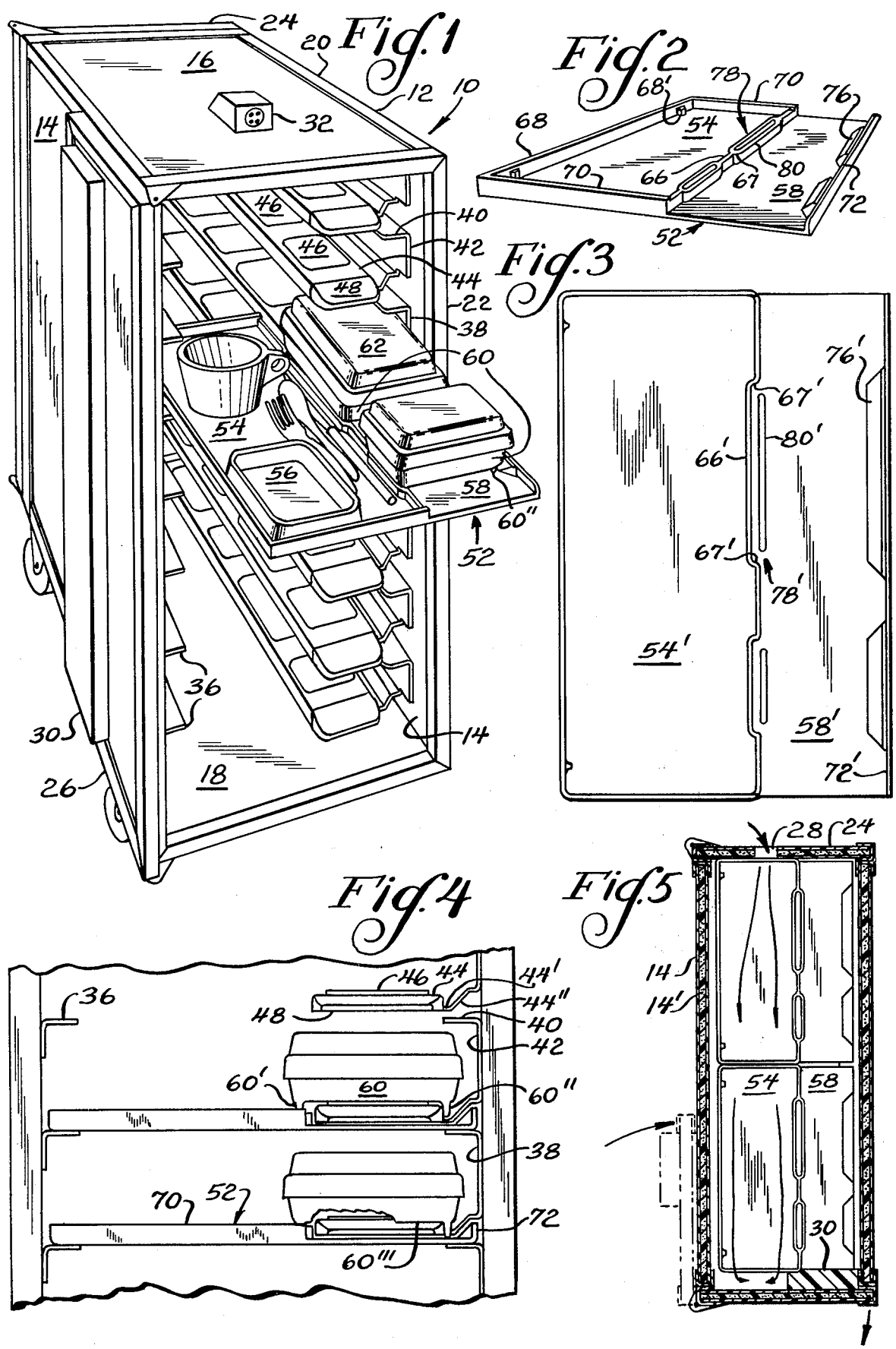

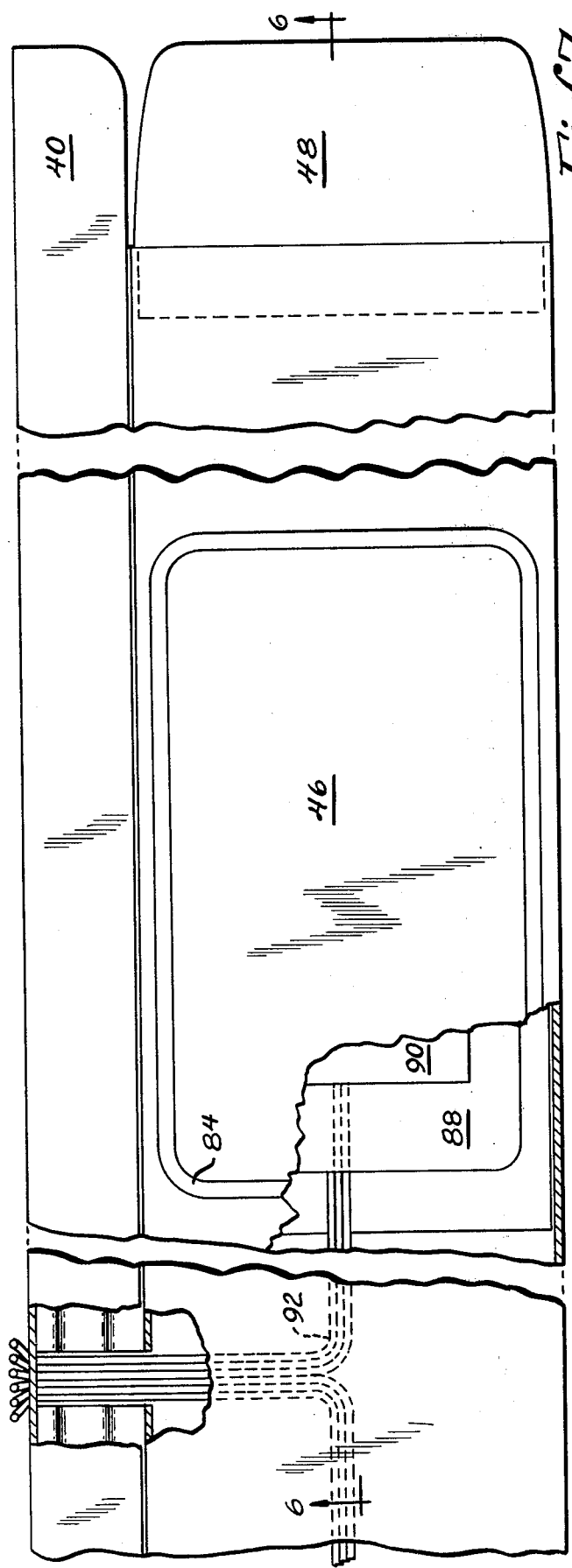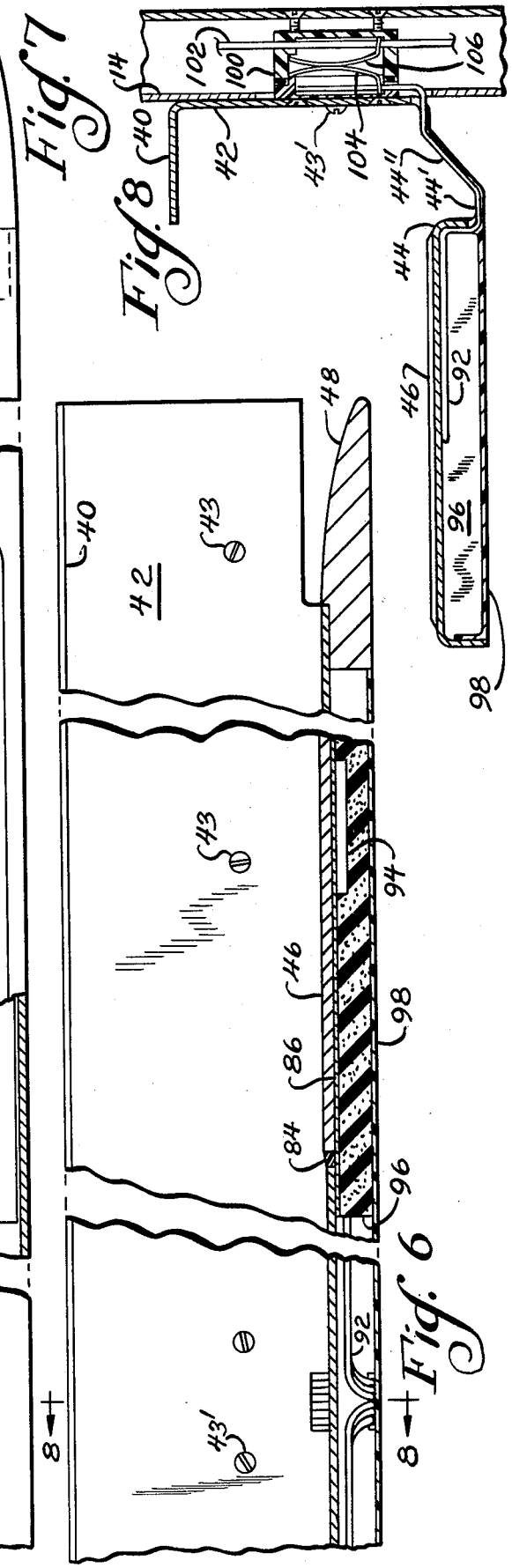

APPARATUS FOR SELECTIVELY HEATING AN INDIVIDUAL FOOD ITEM IN A REFRIGERATED ENVIRONMENT

BACKGROUND OF THE INVENTION

The invention relates to the heating and cooling of food items on meal trays in inflight, institutional or similar types of mass feeding operations. In all of such operations it is desirable that the food reach the person for whom it is intended in a tasteful condition with the hot items hot and the cold items cold. A minimum of handling of the trays is also desirable to reduce the labor cost of serving and a minimum of weight is desirable to ease handling and reduce cost. The weight aspect is especially important for inflight feeding systems. Numerous patentees have attempted to resolve the problem but none completely successfully. U.S. Pat. Nos. related to this subject matter include: Reynolds 2,616,269; Hilliker 2,919,339; Bauman 3,042,384; Traycoff 3,129,041; Foster et al 3,199,579; Stenz 3,205,033; Stenz et al 3,275,393; Nicolaus et al 3,389,946; Golden 3,408,481; Shevlin 3,608,627, 3,725,645, 3,784,787 and 3,830,148; Stevenson 3,615,713, Williams 3,908,749; Mack et al 3,924,100; Colato et al 4,005,745; Shumrack et al 4,041,277; Wyatt 4,052,589; Schulz et al U.S. Pat. No. Re. 30,623 and Tricault French Pat. No. 1,219,352. Some of these systems provide separate hot and cold compartments for hot and cold items and require the assembly of the hot items to the tray of cold items before serving. This is wasteful of labor and, in the case of hospitals, can make it possible for a patient on a restricted diet to receive the wrong food items. Others of these patents require heavy, bulky hot food containers which include integral heaters. There are also systems where each food tray must have its own heater elements. Reynolds teaches heating liquid or solid food in a covered container in a refrigerated atmosphere but the food is not on a tray. Others, such as Colato et al U.S. Pat. No. 4,005,745 and the Tricault French Pat. No. 1,219,352 also heat in a refrigerated atmosphere with the food items being on trays and with the hot food container being normally positioned in a hole in the tray which supports its side edges during carrying. The hole permits the hot food container to be positioned directly over a heating element which is located so as to lift the hot container from the tray as it is being heated. This type of system assures excellent direct contact between the heater and container but presents a danger that a person could be burned or could spill the tray if he accidently put his fingers under the hot dish. The danger would be minimal in a hospital where the tray server places the meal on the bed table or onto a second tray but would be much more significant in an aircraft where the passengers often assist in the passing of trays to the window seat. Furthermore, the grabbing of the tray by the passenger on its close edge with his fingers under the entree portion of what he assumes is a solid tray would possibly cause his fingers to propel the entree into his lap or his neighbor's while the rear edge of the tray falls for lack of support, thereby dumping the cold items on someone's legs or the floor. The aforementioned spillage problem could be avoided by using a second tray under the apertured one during serving but this would take assembly time on the part of the server and introduce additional weight to the aircraft. The Schulz et al U.S. Pat. No. Re. 30,623, owned by a common assignee, solves the aforementioned problems by providing a system wherein a heater shelf is slid under a container which is restrained by transverse abutments on the tray. However, the disclosed design still has certain deficiencies which would tend to reduce its degree of acceptance by potential airline customers.

SUMMARY

It is among the objects of the present invention to provide an apparatus for storing, refrigerating and heating meals, especially aboard aircraft, in such a manner that the food, both hot and cold, will reach the consumer thereof in an optimum temperature condition, while requiring no expenditure of time on the part of the server to assemble the items which constitute the meal.

It is another object of this invention to provide such an apparatus that is light in weight and easy to sterilize, and one wherein the trays are stackable when empty but which, when loaded, can be positioned quite close to each other in a cart-type storage apparatus to achieve maximum capacity.

These and other objects are achieved by the system or apparatus of the present invention wherein portions of the tray carrying enclosure or cabinet, which is preferably in the form of a cart, cooperate with portions of the trays and at least the hot food containing dishes thereon to heat such dishes by applying heat directly to their bottoms while the dishes are temporarily positioned slightly above the solid bottom surface of the tray. The cabinet or enclosure contains a plurality of vertically spaced side guide rails for supporting a plurality of meal service trays in a normally refrigerated atmosphere. To maximize their storage capacity the cabinets preferably are deep enough to accommodate two trays end to end in their longest dimension on each set of guide rails. A generally horizontal thin heater shelf is located in the cabinet in association with each set of side guide rails and is preferably integrally formed with one of the guide rails for an adjacent tray. The heater shelves may be wired so that at least some shelves can be left unheated when the cabinet is not fully loaded. The shelves extend from one of the insulated side walls of the cabinet such that the top surfaces of the entree or passenger facing sides of the trays can be slid under the heater shelves as the trays are loaded into the cabinet. Each heater shelf has heater elements positioned along its length at locations which correspond to the final location in the cabinet of the covered entree or other dishes to be heated. The heater shelves may be made from formed sheet metal such as aluminum or stainless steel and contain heater elements, which can be of various constructions such as etched metal, resistive wire, resistive powder metal, carbon semiconductors or a pyropolymer such as disclosed in Tadewald U.S. Pat. No. 3,973,103. The shelves could also be formed of plastics. There can be one heater element per tray or more than one if it is desired to have the tray contain more than one hot dish. The heater shelves are tapered at at least one end thereof and preferably both so that the cabinet can be loaded or unloaded from each end. The taper can be formed in any suitable manner such as by affixing a plastic member of appropriate tapered shape to the ends of the heater shelves by epoxy, for example. The taper provides a ramp surface which the bottom portion of the dishes which lie between the runners ride up on in order to reach the top surface of the heater shelf. Where the shelves are formed of plastics such as injection molded thermoplastic or compression molded thermoset, the ends can be integrally formed and the heaters and wires can be encapsulated during molding.

The hot dishes must maintain a relatively fixed longitudinal position relative to the tray surface as the tray is slid along the guide rails. This relationship is maintained by virtue of a pair of transverse abutment portions which are integral with the tray. The abutment portions intercept portions of the dishes and preferably the ends of one of a pair of longitudinal runners which extend downwardly from the hot dish. The abutment portions keep the dish from traveling with the heater shelf which is moving under it in a relative sense, and which frictionally engages it, when the tray enters or leaves the cabinet. The heater shelves should be wide enough so the heater elements can contact at least the major portion of the bottoms of the dishes but should terminate short of the abutment portions which are preferably located at the same level to keep the tray height to a minimum. A pair of spaced, longitudinally extending abutment or guide walls are also preferably provided along the length of the tray for retaining the inboard runner of the hot dish. These guide walls counteract the tendency of the dish to rotate during tray movement due to its being engaged at just one corner by the transverse abutment. The guide walls also center the dishes over the heater pads and keep them spaced from the edge of the tray. An angled cam surface on the edge of the tray is adapted to be contacted by the outboard runner on a dish to facilitate assembly of the dish to the tray. By tilting the inboard side of the dish slightly upwardly as the outboard runner is lowered down along the cam surface, the inboard runner will be automatically located above the slot formed by the longitudinal abutments. The inboard runner can then be lowered into the slot and there will be no chance the inboard runner will miss the slot and thus miss the retention provided by the transverse abutments located at the ends of the slot.

The cart interior is normally maintained at a temperature cooler then ambient and can be cooled in any suitable manner such as by being moved into contact with supply and return ducts of a refrigeration unit built into the galley of an aircraft, for example. The air can pass through a first port in the cart, circulate over the trays, and exit through a second port. Alternatively, the galley unit could be formed to sealingly engage with an end of a cart whose door is opened. Other cooling means could be used such as nozzle which injects liquid nitrogen into the cart. Dry ice or regular ice could also be used as an external source of cooling air or could be placed in a cart. To minimize heat loss from the hot dishes and its effect in reducing the cooling effect of the refrigeration unit, an obstruction is preferably mounted on one door of the cart so as to cause the cool air to circulate mainly over the cold sides of the trays.

BRIEF DESCRIPTION OF THE DRAWINGS

FIG. 1 is a perspective view of the food service apparatus of the invention;

FIG. 2 is a perspective view of one embodiment of a meal tray which is usable in the apparatus of FIG. 1;

FIG. 3 is a top view of an alternative embodiment of a meal tray;

FIG. 4 is an end view of the apparatus of FIG. 1 showing the relationship of hot food containers relative to a meal tray before and after the tray is fully loaded into the apparatus;

FIG. 5 is a top sectional view of the housing shown in FIG. 1 which illustrates the flow of cooling air through the apparatus;

FIG. 6 is a fragmentary sectional view of a heater shelf taken on line 6—6 of FIG. 7;

FIG. 7 is a fragmentary, partially broken away top view of the heater shelf; and FIG. 8 is an end sectional view of the heater shelf taken on line 8—8 of FIG. 6.

DESCRIPTION OF THE PREFERRED EMBODIMENTS

Referring now to FIG. 1, the improved food service apparatus is indicated generally at 10. The apparatus includes a wheeled, insulated housing or cart 12 having a pair of side walls 14, a top wall 16, and a bottom wall 18 all of which are joined together by angles 20 and channel members 22. To permit access to the cart from either end by a flight attendant, the cart has a rear door 24 and a front door 26. The walls and doors are all preferably well insulated so as to reduce the cooling load on the refrigeration system (not shown) which would be used to cool the interior. The cart is also preferably made of a laminated construction so as to minimize its weight. As seen in FIG. 5, the walls 14 may be made of a plastic between which is sandwiched a core 14' of foamed plastic material. The angles 20 and channel 22 are also preferably formed of plastic such as laminated fiberglass so as to better insulate the housing and facilitate the bonding of contiguous wall portions. The handles which are typically present at each end of the cart have been omitted for clarity. Such handles facilitate moving the cart and are attached to locking mechanisms which anchor the cart to the carpet in the aisle so that unintentional movement is prevented.

As seen in FIG. 5, the rear door 24 may include an opening 28 which may be of the selectively closable type shown in U.S. Pat. No. 4,180,125. A foam spacer strip 30 is preferably applied to the inside of the front door 26 for the purpose of making sure that all of the trays 52 are forced against the rear door 24 and are thus properly positioned so that refrigeration air entering a port 28 at the rear of the cart can move forward horizontally over some of the trays and vertically before it returns horizontally over other trays and out an exhaust port (not shown) similar to the port 28. The source of cooling air is preferably a refrigeration unit built into the aircraft but other sources of cooling such as dry ice could also be used. The vertically extending spacer strip 30 also performs the function of preventing air from moving vertically in the location which it occupies and thus, the circulation of refrigerated air tends to be concentrated over the cold portions 54 of the trays and somewhat restricted over the hot portions 58. This channelization of the flow helps to reduce the amount of heat withdrawn from containers 60 which are placed on the tray portions 58 and thus reduces the amount of heating power which must be provided to the containers as well as the cooling load on the refrigeration system. A connector 32 shown on top of the housing 12 is adapted to receive a mating connector (not shown) from a source of power in the aircraft which supplies heat to the heating elements within the housing.

Positioned inside the housing along one side wall 14 are a plurality of guide rails members 36. On the opposite wall 14 are located a plurality of channel-shaped heater shelf members 38 which each include an upper tray supporting leg portion 40 which is generally horizontally aligned with one of the guide rails 36. The heater shelf members 38 also include an intermediate web portion 42 which abuts against the inner housing wall and is held thereto by a plurality of fastening elements 43. The lower portion of the channel-shaped member 38 is a heater shelf portion 44 which carries a plurality of heater plate portions 46 and has tapered ramp surfaces 48 at at least one and preferably both ends of the cart 12. as seen more clearly in FIGS. 4 and 8, the heater shelf portion 44 extends generally horizontally but has a down-turned portion near the wall 14 which forms a groove as shown at 44' and is then angled as shown at 44". The purpose of these various shapes will be hereinafter described.

The tray indicated generally at 52 can be seen to include a cold side portion 54 for the purpose of accommodating dishes 56 containing a salad and/or a dessert, for example, as well as a cup, eating utensils and condiments. The forward or passenger facing side of the tray 58 may be termed the hot side since it is adapted to receive one or more hot containers 60 having a back runner portion 60', a front runner portion 60", and a bottom portion 60''' which, when the tray is out of the cart, is spaced from the surface of the tray by the height of the runners 60', 60". A cover 62 is provided for the hot containers 60 and preferably is formed of a lightweight material such as expanded polystyrene. The covers 62 preferably have elongated tapered side portions so that they can be stacked before and after assembly to the containers. They also extend a considerable distance below the top of the containers so as to somewhat restrict the flow of cold air which can contact the containers and withdraw heat therefrom.

As best seen in FIG. 2, the tray 52 includes an integral longitudinal rib portion 66 having a transverse retaining portion 67 for a purpose to be hereinafter described. The longitudinal rib 66 is preferably of a lower height than the back rib portion 68, the side rib portions 70 and the front rib portion 72 so as to facilitate nesting of a plurality of trays. Projections 68' of less height than the back rib 68 also aid in nesting. A ramp surface 76 is preferably integrally formed with the front rib 72 in those regions along the length of the tray wherein a hot container is to be received. The ramp surfaces 76 in the FIG. 2 embodiment and 76' in the FIG. 3 embodiment are adapted to be contacted by the front runner portion 60" of a hot container 60 being lowered onto the tray 52 in order to assure that the back runner portion 60' will properly engage the guiding or retaining means of the tray indicated generally at 78 in FIG. 2 and 78' in FIG. 3. The retaining means 78, 78', as shown, comprise a longitudinal portion of the rib 66, 66' and the parallel rib portions 80, 80' along with the transverse retaining portions 67, 67'. During assembly, the container is slightly tilted so that its front runner 60" is slightly below the back runner 60' and the front runner is then lowered into contact with the ramp surface 76 or 76' and slid down it until it engages the surfaces of the tray at which time the back runner 60' will be aligned between the ribs 66, 80, or 66', 80'. Once the back runner 60' is lowered it will be firmly locked against rotational or fore and aft movement by the rib portions and against longitudinal movement by the transverse retaining or abutment portions 67, 67'. The embodiments of FIGS. 2 and 3 are essentially identical except for the fact that the forward rib 80 is joined to the rear rib 66 in FIG. 2 while the corresponding ribs 66', 80' are separated in FIG. 3. The separation in FIG. 3 facilitates washing of the trays since it helps prevent dirt or food particles from collecting between the ribs. In the FIG. 2 embodiment, where the rib portions 66, 67 and 80 define a continuous closed area, the bottom of the tray is preferably left open between the ribs to facilitate the cleaning of the tray.

As seen in FIGS. 6 and 7 the heater plate portions 46 are preferably mounted in an opening in the heater shelf portion 44 by means of a sealing strip 84 such as silicone. The heater plate 46 is heated by an underlying heating means such as the laminated foil heater assembly 86. In order to provide uniform heating of the containers 60, it is preferable to provide a greater density of heat at the edges of the containers than in the center portions. Thus, an outer peripheral region 88 of the heater 86 should include a heating element having a higher heating density than a heating element in the inner region 90. For example, the main heating element in the region 88 might have a heating density of about 10 watts per square inch whereas the heating element in the center region 90 might have a heating density of only about 5 watts per square inch. Power for the main heating elements in regions 88, 90 and for a separate 2.5 watts per square inch holding or "keep warm" circuit in the outer region 88 is provided through wires 92. The main or primary heater elements (not shown) in regions 88, 90 operate together under the control of a thermostat element 94. This primary heating circuit might have, for example, a power requirement of 90 watts and be thermostatically controlled to a temperature of about 293±9° F. The holding circuit would have a power requirement of about 25 watts and would only operate when the primary heating circuit is opened by a timer (not shown).

In order to minimize heat loss from the heater assembly 86 and to insure that the vast majority of the heat provided will be delivered to the containers 60 an insulating layer of silicone foam 96 is provided beneath the heater assembly 86 and is covered by a plastic bottom cover member 98. Loss of heat is also minimized by having the container runners 60', 60" straddle the heater shelf 44 and heater plate 46. To avoid wasting heat and refrigeration, the cart is preferably fully loaded with trays. Alternatively, the cart could be provided with manually or automatically activated switches to activate only those heaters which are needed. Timers (not shown) control the time at which the heaters are activated and switched off. The heaters discussed above have been found sufficient to raise an entree's temperature from 45° to 160° F. in 40 minutes.

As can be seen in FIG. 8, the recessed portion 44' and the angled portion 44" of the heater shelf 44 are slotted through their thickness so that the flat harness comprising the wires 92 can be neatly carried from the center of the shelf portion 44 through the web portion 42 and into an electrical connector member 100 having one portion fastened to the web portion and another portion fastened to the bus wires 102 which pass through the walls of the cart to the connector 32. The connector 100 contains contacts 104 in the portion carried by the heater shelf and contacts 106 in the portion carried by the cart. The respective contacts 104, 106 resiliently contact each other when the heater shelves 38 are attached to the wall 14 by fasteners 43, 43'.

The operation of loading the trays 52 into the housing or cart 12 can be understood most easily by referring to FIGS. 1 and 4. In FIG. 1, the heater shelf assemblies 38 can be seen to include four heater plates 46 so that two hot dishes on each of two trays can be heated. However, for airline use, it would probably be preferable to have only one heater plate for each meal tray since the hot vegetables are usually combined with the entree in a single container. In such a case, the space occupied by the smaller container 60 on the hot side 58 would probably be used to contain a roll which could be kept somewhat warmer than it would be if positioned on the cold side 54 due to its close proximity to the heated container. When a tray 52 has the hot food container 60 positioned with its rearward runner 60' in the retaining means 78 (FIG. 2) it can be engaged with and started along the guide rails 36 and leg portions 40 as shown in the lower position in FIG. 4. As can be seen in the broken away portion of the drawing, the bottom surface 60''' of the container is initially slightly below the top surface of the heater plate 46. As the tray is then pushed into the cart, the container bottom 60''' will be first contacted by a portion of the tapered ramp surface 48 and then lifted by further relative movement so that when the tray is pushed to the back end of the cart 12 the hot container 60 will overlie the heater plate 46. This latter position is illustrated by the upper tray in FIG. 4. The runners 60', 60'' are made of sufficient height relative to the height of the heater plate 46 so that the ramp surface 48 can easily move under the container 60 and so that the container bottom 60''' will be in firm contact with the heater plate 46. By designing the various elements to a relatively tight tolerance it is possible to have the container lifted only about 0.060 inches. In such a situation the container will tilt very little as it is lifted. This, in turn, minimizes the chance that the cover 62 will be knocked off or that any liquid will spill from the container and permits the successive shelves to be positioned more closely together so as to increase the capacity of a cart. The aforementioned groove-shaped portion 44' of the heater shelf 38 accommodates the forward runner 60'' as the tray is moved longitudinally under the heater shelf. The angled portion 44' of the heater shelf provides clearance for the forward rib 72 of the tray.

The elements of the apparatus 10 can be constructed of any suitable materials but for aircraft use they should be as light in weight as possible. To minimize the heating and cooling load the cart 12 should be very well insulated. The trays 52 should be relatively stiff and resistant to warping and may be made of polyester reinforced with fiberglass as can the food containers. Where the heater shelves 38 are made of aluminum, they are preferably anodized to reduce wear from the frictional engagement of the containers and coated with a fluorocarbon coating to facilitate sliding past the dishes.

We claim as our invention:

1. An apparatus for heating at least one covered container on a meal service tray while other items on the tray are refrigerated comprising an enclosed housing having a plurality of cooperative pairs of guide rail portions therein for supporting a first pair of opposed side edges of a plurality of trays; a plurality of vertically spaced, generally horizontal, thin heater shelves extending from a side wall of said housing; a ramp surface on at least one end of each of said heater shelves; a plurality of meal service trays, each of said trays having at least one abutment portion thereon which extends transversely over a portion thereof relative to said first opposed pair of side edges, said abutment portion being located on said tray to permit restraining contact with said at least one covered container relative to the tray while allowing the tray to be slid along one of said plurality of cooperating pairs of guide rail portions so that one of said thin heater shelves will pass above the tray surface and under the container contacted by said abutment portion, and at a spaced horizontal distance from said abutment portion, the ramp surface on each of said heater shelves being adapted to lift a covered container located on said tray adjacent said at least one abutment and permit a flat heater plate portion of said heater shelf with which said container is frictionally engaged to pass under said container as said container is restrained by said at least one abutment portion, said at least one container and said tray and/or said heater shelf having longitudinally extending rib and groove complementary guiding portions thereon for insuring that said at least one container will be restrained from rotational or transverse movement as said container and tray are moved relative to said heater shelf.

2. The apparatus of claim 1 wherein said covered containers each have a pair of spaced, longitudinally extending, parallel runners which straddle said heater plate portion, said runners having a height such that the bottom surface of each of said containers will be closer to the tray surface when the container is out of contact with the heater plate portions than when it is in contact, said height being sufficient to permit the leading portion of the heater shelf ramp surface to pass under a portion of the container bottom surface before said bottom surface is contacted by other portions of said ramp surface.

3. The apparatus of claim 2 wherein at least some of the tray supporting guide rail portions are formed integrally with at least some of said heater shelves in a channel-shaped configuration, said channel-shaped members having vertical web portions attached one above the other on one side wall of said housing so that the upper guide rail portion of one channel member is positioned just under the heater shelf portion of an adjacent channel member.

4. The apparatus of claim 3 wherein said heater shelf portions have a horizontal elongated portion within which said flat heater plate portion is mounted, said horizontal elongated portion being joined to said vertical web portion by a generally U-shaped, downwardly extending groove portion, said U-shaped groove portion being adapted to accommodate one of the parallel runners on a covered container when the bottom of the container is in contact with the heater plate portion, the other of the parallel runners being beyond the extent of the heater shelf portion at the edge thereof which is most remote from the vertical web portion.

5. The apparatus of claim 1 wherein the flat heater plate portion of the heater shelf has insulation underlying it and immediately surrounding it.

6. The apparatus of claim 5 wherein the flat heater plate portion has a horizontal planar extent which is less than or equal to the planar extent of the bottom of a container which it is adapted to heat.

7. The apparatus of claim 6 wherein the flat heater plate portion extends slightly above the surface of the heater shelf which surrounds it.

8. The apparatus of claim 1 wherein the heater plate portion includes heating elements which provide a greater heating density at its outer edge regions that at its central region.

9. The apparatus of claim 1 wherein the enclosed housing has a pivoted door on at least one end thereof which carries an inwardly extending vertical strip of material on one side of its inner surface, said vertical strip being adapted to contact the side portion of one end of the trays in said housing which is closest to the heater shelves and block the vertical flow of refrigerated air.

10. A stackable food service tray for use in a food serving system wherein a covered container of food to be served hot must be heated while positioned on the tray with the tray and container located in a refrigerated environment, said tray being integrally molded of plastic and having a flat bottom whose upper surface is divided into a "hot" forward portion and a "cold" rearward portion by an upwardly extending longitudinal rib portion which extends to the sides of the tray and is joined to side rib portions and to a rear rib portion so as to completely surround the "cold" portion; said tray also having an upwardly extending front rib portion which cooperates with said longitudinal rib portion to define the fore and aft extent of the "hot" portion, the sides of said "hot" portion being free of upwardly extending rib portions so as to permit a fixed, generally horizontal heater shelf to be moved relative to the tray and longitudinally from one side over the surface of the tray and under a food container positioned thereon; said front, side and rear rib portions each having a height at least as great as the height of said longitudinal rib portion, and integral food container restraining means extending upwardly from said tray and adapted to engage lower portions of a longitudinal runner on a food container placed on said tray and restain the container against any substantial longitudinal or transverse movement relative to the tray when a heater shelf is slidably moved under and relative to the container and in frictional engagement with it.

11. The tray of claim 10 wherein said upwardly extending front rib portion includes an integral ramp portion which is tapered downwardly toward said "hot" forward portion of said tray in the region thereof which is adapted to receive a food container, said ramp portion being adapted to be engaged by a first longitudinal runner on a food container when the latter is assembled in a slightly downwardly tilted manner to the tray, thus causing a second longitudinal runner on said container to be correctly aligned with said food container restraining means as said container is lowered to a horizontal position.

12. The tray of claim 10 wherein said food container restraining means comprise longitudinally and transversely extending portions of said longitudinal rib portion and an auxiliary rib portion positioned parallel to and spaced from said longitudinally extending portion by a distance sufficient to accommodate the width of a longitudinal runner on a food container.

13. The tray of claim 12 wherein said longitudinal rib portion is of lesser height than the rib portions located around the periphery of the tray and the peripheral rib portions are tapered so that a plurality of empty trays can be stacked together in nesting relationship having a total height which is less than the combined height of all of the individual trays in the stack.

* * * * *